(12) United States Patent
Chen (10) Patent No.: US 9,736,440 B2
(45) Date of Patent: Aug. 15, 2017

(54) HOLOGRAPHIC PROJECTION DEVICE CAPABLE OF FORMING A HOLOGRAPHIC IMAGE WITHOUT MISALIGNMENT

(71) Applicant: Chunghwa Picture Tubes, Ltd., Taoyuan (TW)

(72) Inventor: Chien-Hung Chen, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 192 days.

(21) Appl. No.: 14/722,143

(22) Filed: May 26, 2015

(65) Prior Publication Data
US 2016/0353071 A1 Dec. 1, 2016

(51) Int. Cl.
*H04N 9/31* (2006.01)
*G09G 3/00* (2006.01)

(52) U.S. Cl.
CPC ........... *H04N 9/3185* (2013.01); *G09G 3/003* (2013.01); *H04N 9/3147* (2013.01); *H04N 9/3194* (2013.01)

(58) Field of Classification Search
USPC ...................................................... 348/40, 41
See application file for complete search history.

(56) References Cited

U.S. PATENT DOCUMENTS

| | | | |
|---|---|---|---|
| 5,495,576 A * | 2/1996 | Ritchey | G06T 17/00 345/420 |
| 6,028,608 A * | 2/2000 | Jenkins | G06T 1/0021 345/619 |
| 6,525,722 B1 * | 2/2003 | Deering | G06T 9/001 345/419 |
| 7,420,557 B1 * | 9/2008 | Moreton | G06T 15/30 345/427 |
| 9,229,227 B2 * | 1/2016 | Border | G02B 27/0093 |
| 9,230,368 B2 * | 1/2016 | Keane | G06T 19/006 |
| 2005/0078053 A1 * | 4/2005 | Kondo | G06T 15/10 345/8 |
| 2011/0254916 A1 * | 10/2011 | Fan | G02B 27/2278 348/41 |
| 2012/0069232 A1 | 3/2012 | Chui | |
| 2013/0022222 A1 * | 1/2013 | Zschau | G03H 1/0808 381/306 |
| 2013/0301909 A1 * | 11/2013 | Sato | G01B 11/25 382/154 |

(Continued)

FOREIGN PATENT DOCUMENTS

| | | |
|---|---|---|
| CN | 101290467 A | 10/2008 |
| CN | 101881922 A | 11/2010 |

(Continued)

*Primary Examiner* — Paulos M Natnael
(74) *Attorney, Agent, or Firm* — Winston Hsu (57) ABSTRACT

A holographic projection device includes an image display and a plurality of reflective projection panels. The plurality of reflective projection panels intersect one another at an vertex. A method for operating the holographic projection device includes receiving projection coordinates of the vertex on the image display, receiving a vector connecting coordinates of an image center of the image display and the projection coordinates of the vertex, and shifting a plurality of images displayed on the image display according to the vector to project the plurality of images onto the plurality of reflective projection panels to form a holographic image.

15 Claims, 7 Drawing Sheets

(56) References Cited

U.S. PATENT DOCUMENTS

2014/0225887 A1* 8/2014 Aguirre-Valencia H04N 13/0022
                                                              345/419
2015/0109581 A1    4/2015 Waisman
2016/0018924 A1*   1/2016 Liu .......................... G06F 3/042
                                                              345/174

FOREIGN PATENT DOCUMENTS

| CN | 103109224 A  | 5/2013  |
| CN | 103207513 A  | 7/2013  |
| TW | M388006      | 9/2010  |
| TW | 201234100 A1 | 8/2012  |
| TW | I465827      | 12/2014 |

* cited by examiner

HOLOGRAPHIC PROJECTION DEVICE CAPABLE OF FORMING A HOLOGRAPHIC IMAGE WITHOUT MISALIGNMENT

BACKGROUND OF THE INVENTION

1. Field of the Invention

This invention relates to a holographic device, and more particularly, a holographic device that can align an image center with a vertex of a plurality of reflective projection panels to form a holographic image.

2. Description of the Prior Art

A holographic image is commonly formed by projecting different views of a three-dimensional object from their respective angles. After the holographic image is formed, it appears as the three-dimensional object floating in space. Due to the ability of creating a sense of reality, the holographic projection device can be used in augment reality applications. For example, the holographic image may be used on a theater stage to interact with real actors so that the audience can experience a fantasy between reality and illusion.

Figure 1:
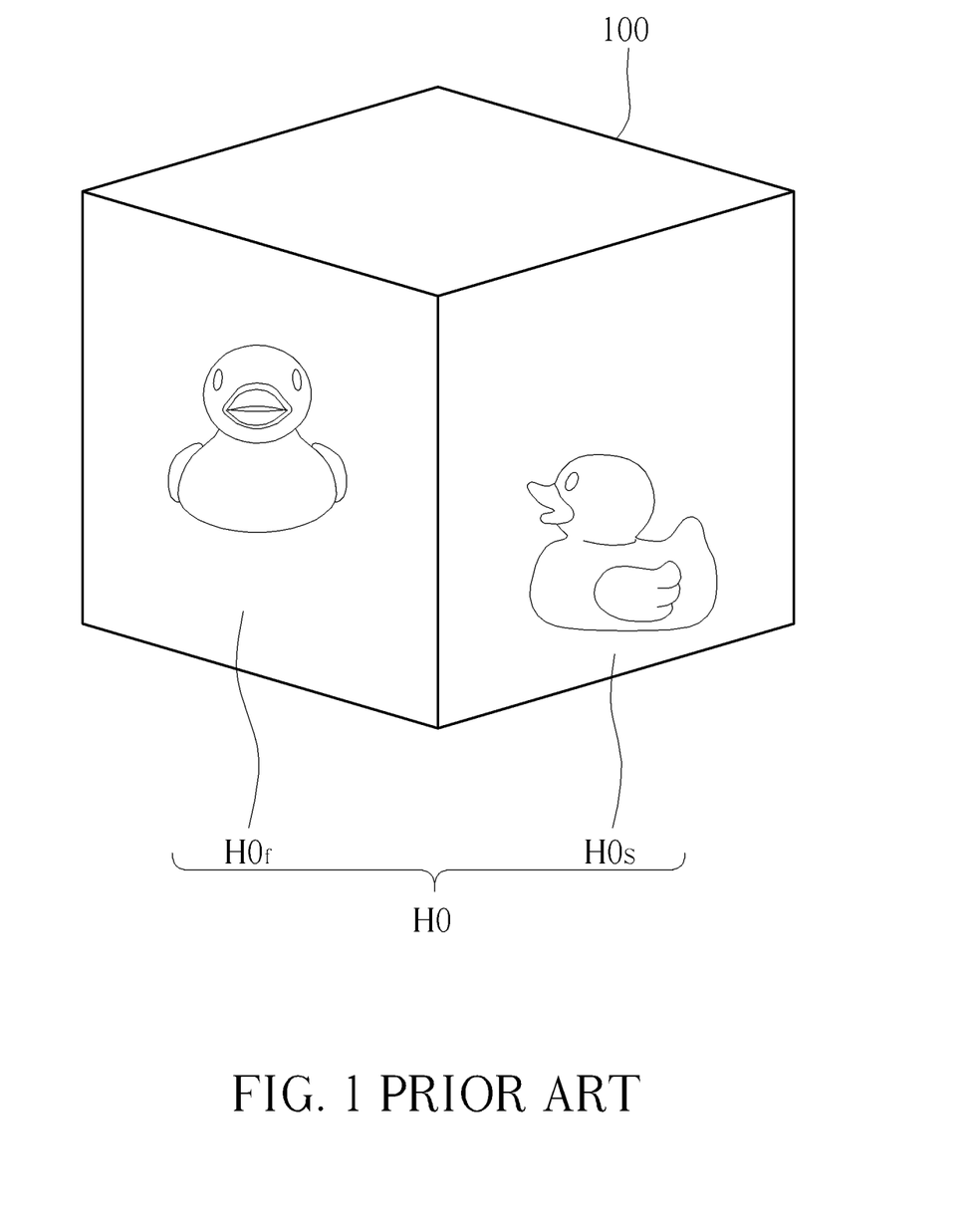
FIG. 1 shows a holographic image according to prior art.

FIG. 1 shows a holographic image of a duck formed by a holographic projection device 100 of prior art. Since the holographic image is composed of different views of the duck, it is crucial for the different views to be aligned accurately. In FIG. 1, the holographic image H0 shows a front view $H0_f$ of the duck and a side view $H0_s$ of the duck. However, since the front view $H0_f$ of the duck is displayed higher than the side view $H0_s$ of the duck, the holographic image would be misaligned at the boundary of the portions formed by the front view $H0_f$ and the side view $H0_s$ of the duck. Therefore, it is critical to fix misalignment at the boundary of portions formed by different views in a holographic image.

SUMMARY OF THE INVENTION

One embodiment of the present invention discloses a method for operating a holographic projection device. The holographic projection device comprises an image display and a plurality of reflective projection panels. The plurality of reflective projection panels are intersecting one another at an vertex. The method comprises receiving projection coordinates of the vertex on the image display, receiving a vector connecting coordinates of an image center of the image display and the projection coordinates of the vertex, and shifting a plurality of images displayed on the image display according to the vector to project the plurality of images onto the plurality of reflective projection panels to form a holographic image.

Another embodiment of the present invention discloses a holographic projection device. The holographic projection device comprises a plurality of reflective projection panels, an image display, a position sensing module, and a processor. The plurality of reflective projection panels intersect one another at an vertex. The image display is used to project a plurality of images onto the plurality of reflective projection panels. The position sensing module is used to detect projection coordinates of the vertex on the image display. The processor is used to receive a vector connecting coordinates of an image center of the image display and the projection coordinates of the vertex, and shift the plurality of images displayed on the image display according to the vector to project the plurality of images onto the plurality of reflective projection panels to form a holographic image.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
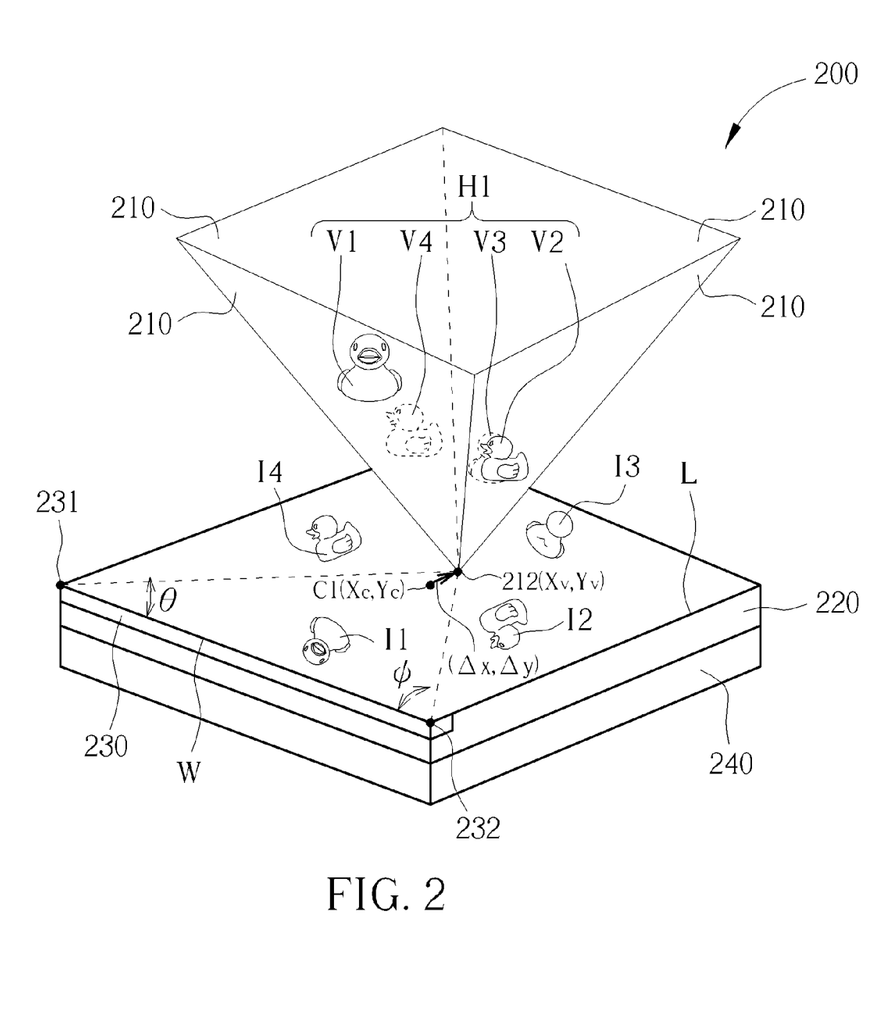
FIG. 2 shows a holographic projection device according to one embodiment of the present invention.

FIG. 2 shows a holographic projection device 200 according to one embodiment of the present invention. The holographic projection device 200 may include a plurality of reflective projection panels 210, an image display 220, a position sensing module 230, and a processor 240. The plurality of reflective projection panels 210 may intersect one another at a vertex 212 and the image display 220 may project a plurality of images onto the plurality of reflective projection panels 210.

In FIG. 2, the holographic projection device 200 may include four reflective projection panels 210, and the four reflective projection panels 210 may intersect one another at the vertex 212. In this case, the four reflective projection panels 210 may form a square base pyramid. In other embodiments of the present invention, the holographic projection device 200 may have a different number of reflective projection panels.

The vertex 212 may be disposed close to the image display 220 so the four images I1 to I4 displayed by the image display 220 may be projected onto the four reflective projection panels 210 respectively. The four images I1 to I4 projected by the image display 220 may be different views of an object so as to form a holographic image H1 of the object.

The reflective projection panels 210 may be made of material that is both reflective and transparent, such as glass or acrylic, so the reflective projection panels 210 may generate virtual images V1 to V4 of the images I1 to I4 displayed by the image display 220 and the virtual images V1 to V4 may be seen through the reflective projection panels 210. In some embodiments of the present invention, the angle between each of the reflective projection panels 210 and the image display 220 may be 45 degrees so the holographic image H1 formed by the virtual images V1 to V4 may be perpendicular to the image display 220. However, the angle is not limited to 45 degrees in the present invention.

In addition, the plurality of images I1 to I4 may be displayed with respect to an image center C1 of the image display 220, that is, the distances from the four images I1 to I4 to the image center C1 are all the same. In some embodiments of the present invention, the image center C1 of the image display 220 may be a geographic center of the image display 220 by default. For example, in FIG. 2, the image display 220 may display the plurality of images I1 to I4 with respect to the geographic center of the image display 220. However, since the projection coordinates $(x_v, y_v)$ of the vertex 212 on the image display 220 do not substantially overlap with the coordinates $(x_c, y_c)$ of the image center C1 of the image display 220, the distances between the four images I1 to I4 and the vertex 212 may be different, causing the distances between the virtual images V1 to V4 and the image display 220 to be different. Consequently, the distances between the four sides of the holographic image H1 and the image display 220 may be different, thus the four sides of the holographic image H1 are misaligned.

To align the four sides of the holographic image H1, the coordinates $(x_c, y_c)$ of the image center C1 of the image display 220 should substantially overlap with the projection coordinates $(x_v, y_v)$ of the vertex 212 on the image display 220. The position sensing module 230 and the processor 240 may be used to align the projection coordinates $(x_v, y_v)$ of the vertex 212 on the image display 220 and the coordinates $(x_c, y_c)$ of the image center C1 of the image display 220.

The position sensing module 230 may be used to detect projection coordinates $(x_v, y_v)$ of the vertex 212 on the image display 220. The projection coordinates $(x_v, y_v)$ of the vertex 212 on the image display 220 may be coordinates of the orthogonal projection of the vertex 212 on the image display 220. In some embodiments of the present invention, the vertex 212 may directly contact with the image display 220. In this case, the projection coordinates $(x_v, y_v)$ of the vertex 212 on the image display 220 may be coordinates of a point on the image display 220 that the vertex 212 contacts with.

In FIG. 2, the position sensing module 230 may include two image sensors 231 and 232 to derive the projection coordinates $(x_v, y_v)$ of the vertex 212. For example, the image sensor 231 may detect an angle θ between an edge W of the image display 220 and the contact point of the vertex 212 on the image display 220 with respect to the image sensor 231 and the image sensor 232 may detect an angle Ø between the edge W of the image display 220 and the contact point of the vertex 212 on the image display 220 with respect to the image sensor 232. Since the length $L_W$ of the edge W is a known factor, the projection coordinates $(x_v, y_v)$ of the vertex 212 on the image display 220 may be derived as $$\left(\frac{L_w \times \tan\phi}{\tan\theta + \tan\phi}, \frac{L_w \times \tan\phi}{\tan\theta + \tan\phi} \times \tan\theta\right).$$

Once the projection coordinates $(x_v, y_v)$ of vertex 212 on the image display 220 is derived, a vector $(\Delta x, \Delta y)$ connecting the coordinates $(x_c, y_c)$ of the image center C1 of the image display 220 and the projection coordinates $(x_v, y_v)$ of the vertex 212 on the image display 220 may be generated as $$\left(x_v - \frac{L_w}{2}, y_v - \frac{L_L}{2}\right)$$

where $L_L$ is a length of an edge L of the image display 212, and the coordinates $(x_c, y_c)$ of the image center C1 of the image display 220 is at the geographic center of the image display 220 with coordinates of $$\left(\frac{L_w}{2}, \frac{L_L}{2}\right),$$

which are both known factors.

Figure 3:
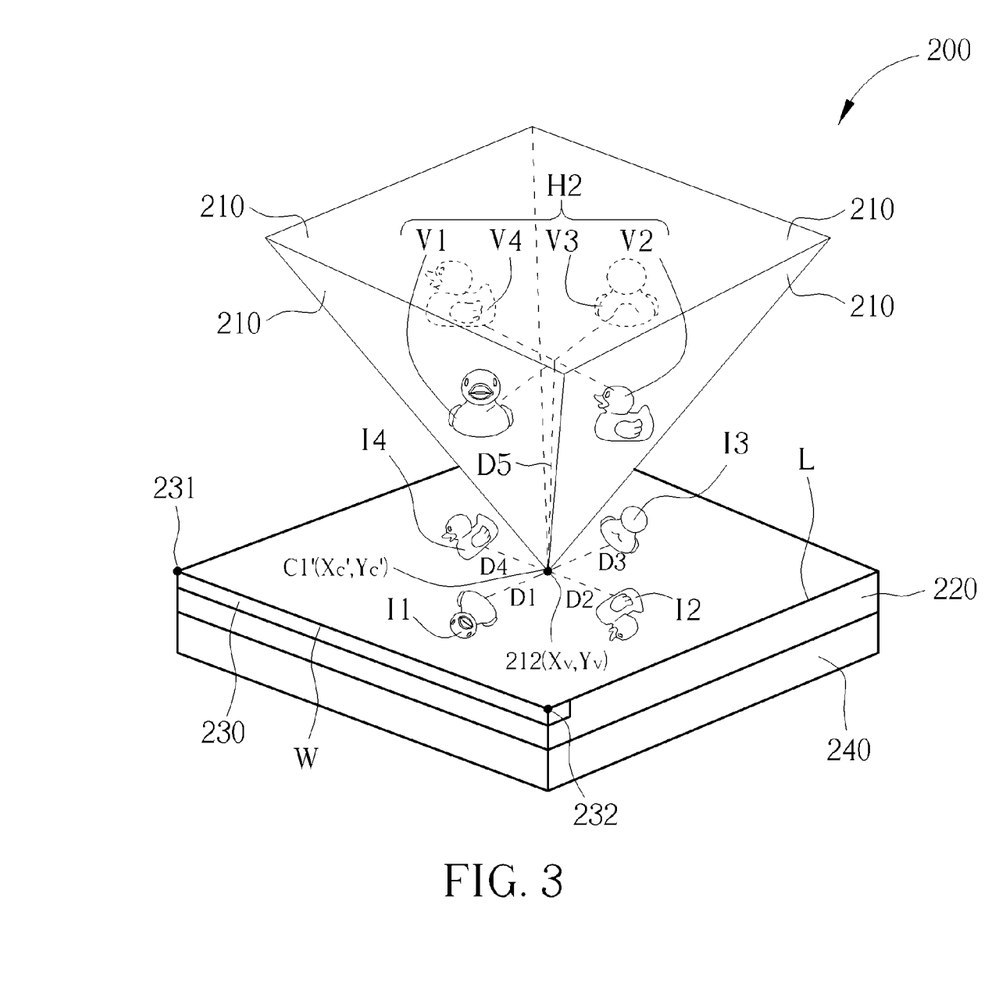
FIG. 3 shows a holographic image projected by the holographic projection device in FIG. 2.

The processor 240 may receive the vector $(\Delta x, \Delta y)$, and shift the plurality of images I1 to I4 displayed on the image display 220 according to the vector $(\Delta x, \Delta y)$, that is to shift the image center C1 of the image display 220. In FIG. 3, the coordinates $(x_c', y_c')$ of the shifted center C1' of the image display 220 are shifted to overlap with the projection coordinates $(x_v, y_v)$ of vertex 212 so the distances from the four images I1 to I4 to the projection coordinates $(x_v, y_v)$ of the vertex 212 are the same and the four images I1 to I4 may be projected onto the four reflective projection panels 210 to form the holographic image H2 without any misalignment.

Moreover, after the processor 240 shifts the images I1 to I4 according to the vector $(\Delta x, \Delta y)$, the vertex 212 may be changed by the user again. In this case, the processor 240 may further shift the images I1 to I4 again with respect to a vector connecting the coordinates $(x_c', y_c')$ of the shifted center C1' of the image display 220 and new projection coordinates of the vertex 212 that was changed by the user to align the coordinates $(x_c', y_c')$ of the shifted center C1' of the image display 220 and new projection coordinates of the vertex 212.

Although, in FIG. 2, the position sensing module 230 includes two image sensors, the present invention is not limited to apply two image sensors in the position sensing module. In other embodiments of the present invention, the position sensing module may include even more image sensors for detecting the projection coordinates of the vertex when the vertex does not contact with the image display directly. Also, in other embodiments of the present invention, the position sensing module may include a touch sensor instead of image sensors to detect projection coordinates of the vertex on the image display when the vertex contacts with the image display directly.

Figure 4:
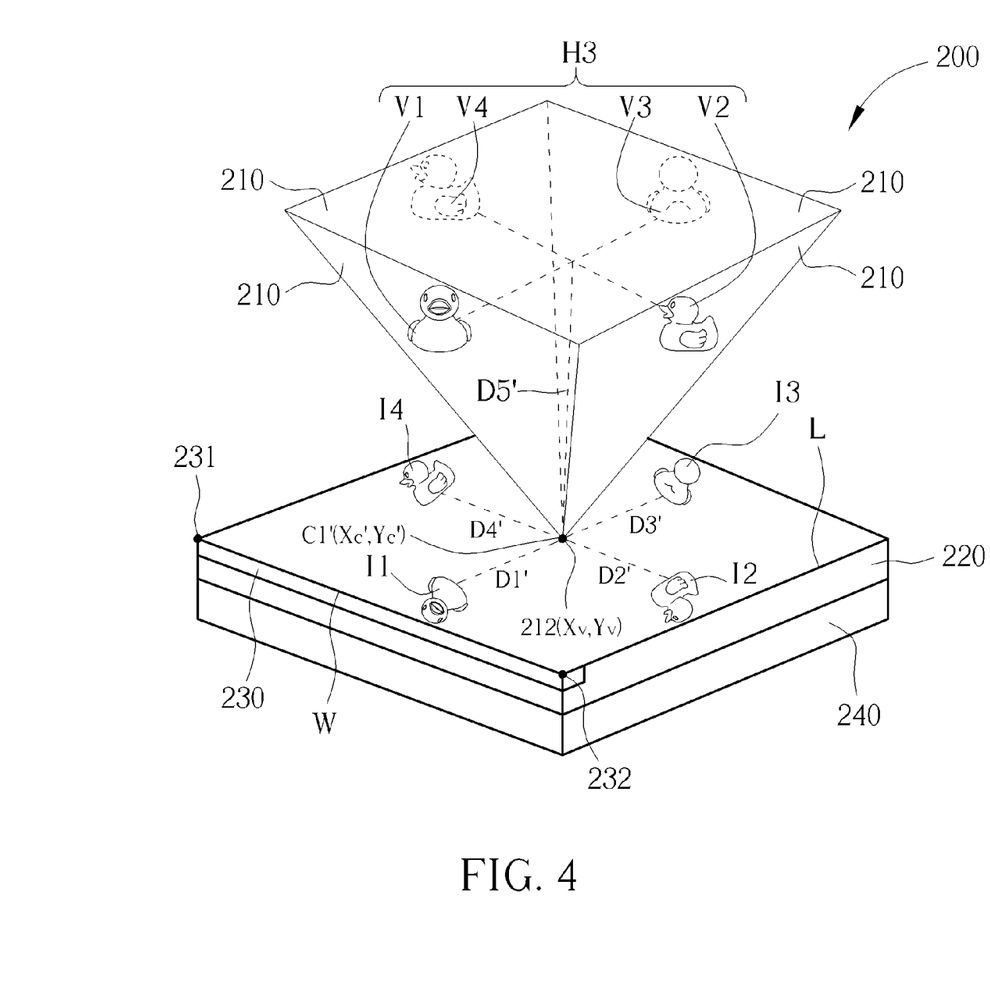
FIG. 4 shows another holographic image projected by the holographic projection device in FIG. 2.

Furthermore, the processor 240 may increase distances D1 to D4 between the plurality of images I1 to I4 and the projection coordinates $(x_v, y_v)$ of the vertex 212 to increase a distance D5 between the holographic image H2 and the image display 220. FIG. 4 shows the holographic image H3 projected by the holographic projection device 200 according to one embodiment of the present invention. The distances D1' to D4' between the plurality of images I1 to I4 and the projection coordinates $(x_v, y_v)$ of the vertex 212 in FIG. 4 are greater than the distances D1 to D4 between the plurality of images I1 to I4 and the projection coordinates $(x_v, y_v)$ of the vertex 212 in FIG. 3. Consequently, the distance D5' between the holographic image H3 and the image display 220 is greater than the distance D5 between the holographic image H2 and the image display 220. In some embodiments of the present invention, the distance between the holographic image and the image display may be seen as a height of the holographic image from the image display. In this case, by increasing the distances between the plurality of images I1 to I4 and the projection coordinates $(x_v, y_v)$ of the vertex 212, the height of the holographic image is raised.

Figure 5:
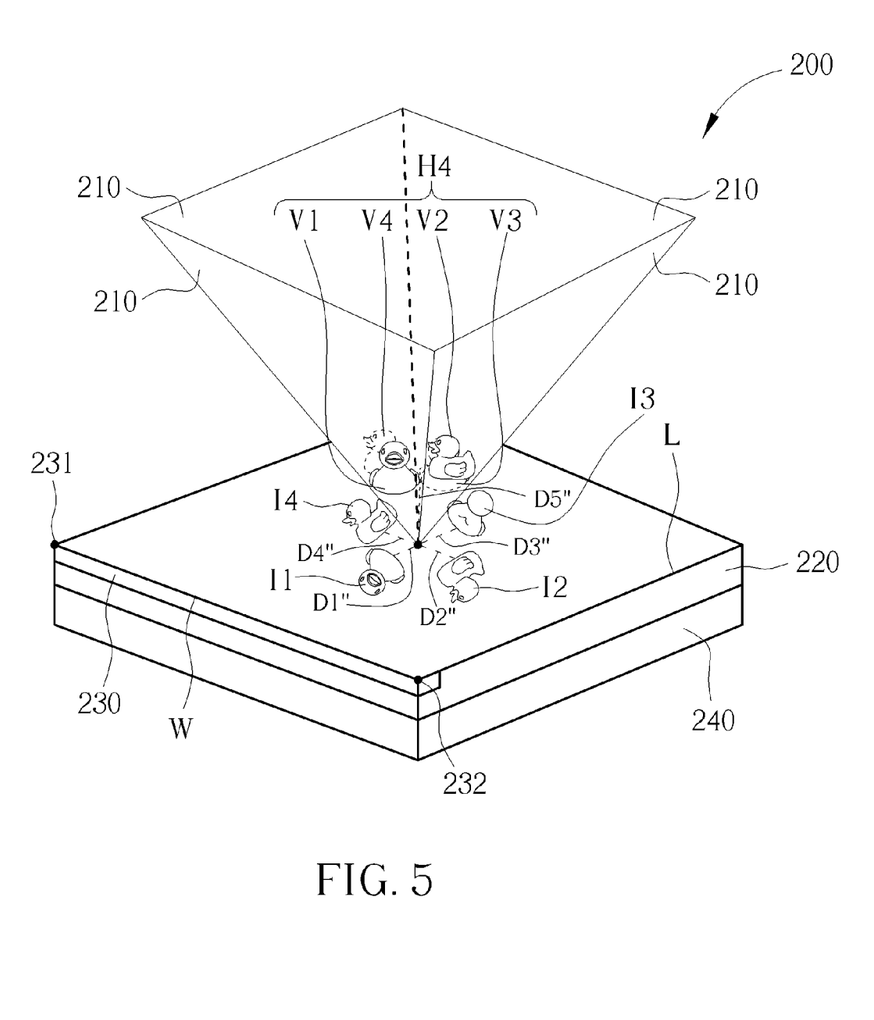
FIG. 5 shows another holographic image projected by the holographic projection device in FIG. 2.

Similarly, the processor 240 may decrease the distances D1 to D4 between the plurality of images I1 to I4 and the projection coordinates $(x_v, y_v)$ of the vertex 212 to decrease the distance D5 between the holographic image H2 and the image display 220. FIG. 5 shows the holographic image H4 projected by the holographic projection device 200 according to one embodiment of the present invention. The distances D1" to D4" between the plurality of images I1 to I4 and the projection coordinates $(x_v, y_v)$ of the vertex 212 in FIG. 5 are smaller than the distances D1 to D4 between the plurality of images I1 to I4 and the projection coordinates $(x_v, y_v)$ of the vertex 212 in FIG. 3. Consequently, the distance D5" between the holographic image H4 and the image display 220 is smaller than the distance D5 between the holographic image H2 and the image display 220. In other words, the height of the holographic image H4 is lowered by decreasing the distances between the plurality of images I1 to I4 and the projection coordinates $(x_v, y_v)$ of the vertex 212.

Figure 6:
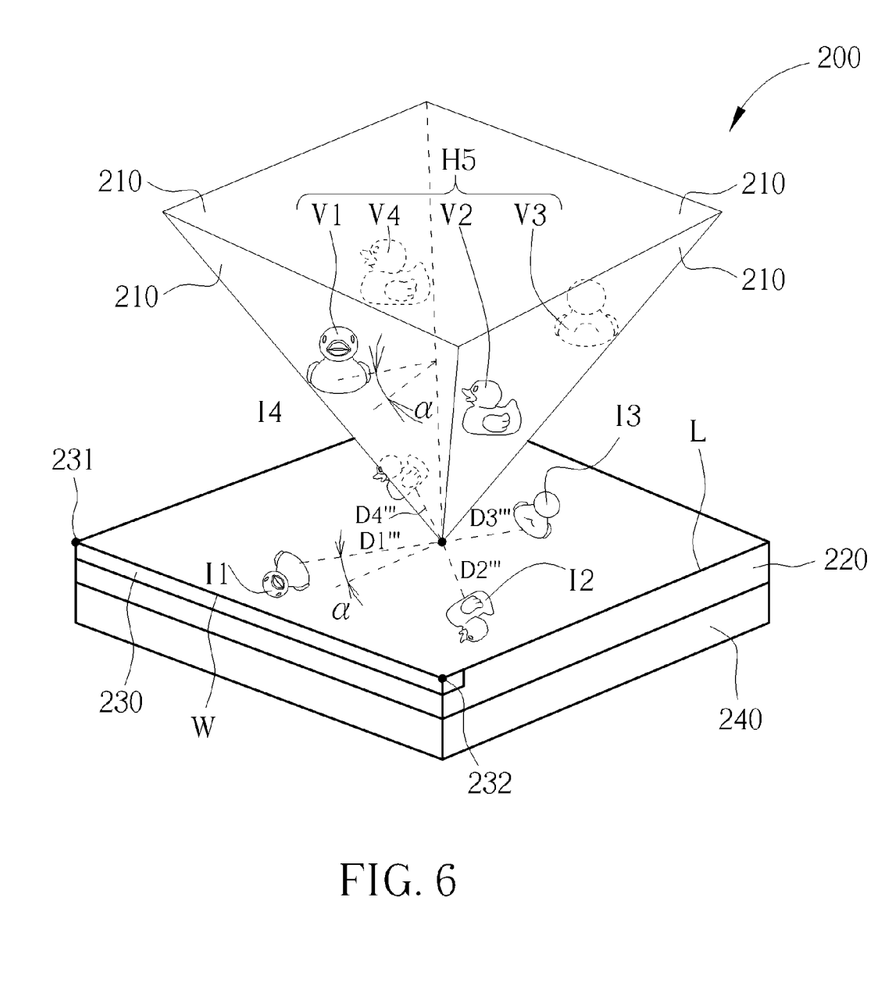
FIG. 6 shows another holographic image projected by the holographic projection device in FIG. 2.

In addition, the processor 240 may rotate the plurality of images I1 to I4 with respect to the projection coordinates $(x_v, y_v)$ of the vertex 212 on the image display 220 so that the position of the holographic image H2 on the plurality of reflective projection panels 210 may be adjusted. FIG. 6 shows a holographic image H5 projected by the holographic projection device 200 according to one embodiment of the present invention. In FIG. 6, the images I1 to I4 are rotated with respect to the projection coordinates $(x_v, y_v)$ of the vertex 212 by a degree α on the image display 220 so as to rotate the holographic image H5 by a degree α.

Since the processor 240 may shift the plurality of images I1 to I4 displayed on the image display 220 according to the vector $(\Delta x, \Delta y)$ when the projection coordinates $(x_v, y_v)$ of the vertex 212 on the image display 220 do not substantially overlap with the coordinates $(x_c, y_c)$ of the image center C1, the holographic projection device 200 is able to project the plurality of images I1 to I4 onto the plurality of reflective projection panels 210 to form the holographic image H2 without misalignment. Furthermore, the processor 240 may adjust the distances D1 to D4 between the plurality of images I1 to I4 and the projection coordinates $(x_v, y_v)$ of the vertex 212 and/or rotate the plurality of images I1 to I4 with respect to the projection coordinates $(x_v, y_v)$ of the vertex 212 to adjust the position of the holographic image H2 on the plurality of reflective projection panels 210. Therefore, the holographic projection device 200 is not only able to fix misalignment but is also able to adjust the position of the holographic image according to various application requirements.

Figure 7:
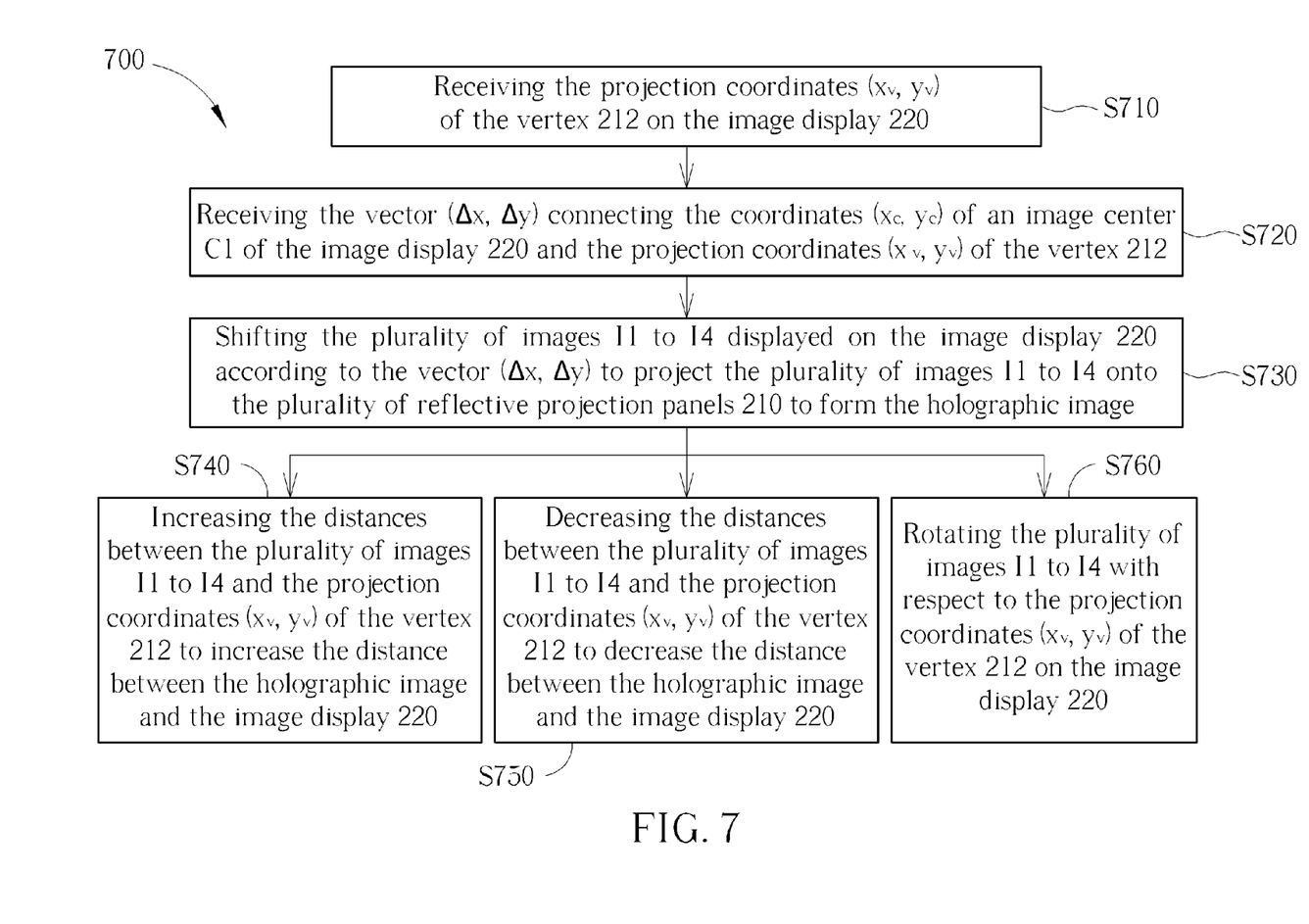
FIG. 7 shows a flow chart of a method for operating the holographic projection device in FIG. 2 according to one embodiment of the present invention.

FIG. 7 shows a method 700 for operating a holographic projection device 200 according to one embodiment of the present invention. The method 700 includes steps S710 to S730:

S710: receiving the projection coordinates $(x_v, y_v)$ of the vertex 212 on the image display 220;

S720: receiving the vector $(\Delta x, \Delta y)$ connecting the coordinates $(x_c, y_c)$ of an image center C1 of the image display 220 and the projection coordinates $(x_v, y_v)$ of the vertex 212; and S730: shifting the plurality of images I1 to I4 displayed on the image display 220 according to the vector $(\Delta x, \Delta y)$ to project the plurality of images I1 to I4 onto the plurality of reflective projection panels 210 to form the holographic image.

In some embodiments of the present invention, after the processor 240 receives the projection coordinates $(x_v, y_v)$ of the vertex 212 on the image display 220 in step S710, the processor 240 may further determine if the projection coordinates $(x_v, y_v)$ of the vertex 212 substantially overlap with the coordinates $(x_c, y_c)$ of the image center C1. If the projection coordinates $(x_v, y_v)$ of the vertex 212 do not substantially overlap with the coordinates $(x_c, y_c)$ of the image center C1, a misalignment may occur. Consequently, the processor 240 may receive the vector $(\Delta x, \Delta y)$ connecting coordinates $(x_v, y_v)$ of the image center C1 of the image display 220 and the projection coordinates $(x_v, y_v)$ of the vertex 212 in step S720 and shift the plurality of images I1 to I4 according to the vector $(\Delta x, \Delta y)$ in step S730. However, if the projection coordinates $(x_v, y_v)$ of the vertex 212 overlap with the coordinates $(x_c, y_c)$ of the image center C1, then the processor doesn't shift the images.

Furthermore, in some embodiments of the present invention, the method 700 may further include steps S740 to S760:

S740: increasing the distances between the plurality of images I1 to I4 and the projection coordinates $(x_v, y_v)$ of the vertex 212 to increase the distance between the holographic image and the image display 220;

S750: decreasing the distances between the plurality of images I1 to I4 and the projection coordinates $(x_v, y_v)$ of the vertex 212 to decrease the distance between the holographic image and the image display 220; and S760: rotating the plurality of images I1 to I4 with respect to the projection coordinates $(x_v, y_v)$ of the vertex 212 on the image display 220.

By operating steps S740 and S750, a height of the holographic image can adjusted as the system need. Also, steps S740 to S760 may be operated more than one time in any sequence according the application needs. For example, the processor 240 may increase distances between the plurality of images I1 to I4 and the projection coordinates $(x_v, y_v)$ of the vertex 212 firstly, then rotate the plurality of images I1 to I4 with respect to the projection coordinates $(x_v, y_v)$ of the vertex 212 on the image display 220, and then increase distances between the plurality of images I1 to I4 and the projection coordinates $(x_v, y_v)$ of the vertex 212 again to project the holographic image at a proper position. In some embodiment of the present invention, steps S710 to S760 may be done by the processor 240.

According to the holographic projection device and the method for operating the holographic projection device provided by the embodiments of the present invention, the problem of misaligning the holographic image can be solved. Furthermore, the position of the holographic image can be adjusted easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a holographic projection device, the holographic projection device comprising an image display and a plurality of reflective projection panels, the plurality of reflective projection panels intersecting one another at an vertex, and the method comprising:
   receiving projection coordinates of the vertex on the image display;
   receiving a vector connecting coordinates of an image center of the image display and the projection coordinates of the vertex; and
   shifting a plurality of images displayed on the image display according to the vector to project the plurality of images onto the plurality of reflective projection panels to form a holographic image.

2. The method of claim 1, further comprising:
   determining if the projection coordinates of the vertex substantially overlap with the coordinates of the image center;

wherein if the projection coordinates of the vertex do not substantially overlap with the coordinates of the image center, the plurality of images are shifted according to the vector.

3. The method of claim 1, wherein the holographic projection device further comprises a position sensing module configured to receive the projection coordinates of the vertex on the image display.

4. The method of claim 3, wherein the position sensing module comprises a plurality of image sensors.

5. The method of claim 3, wherein the position sensing module comprises a touch sensor.

6. The method of claim 1, further comprising:
increasing a distance between each of the plurality of images and the projection coordinates of the vertex to increase a distance between the holographic image and the image display.

7. The method of claim 1, further comprising:
decreasing a distance between each of the plurality of images and the projection coordinates of the vertex to decrease a distance between the holographic image and the image display.

8. The method of claim 1, further comprising:
rotating the plurality of images with respect to the projection coordinates of the vertex on the image display.

9. The method of claim 1, wherein the image center is a geographic center of the image display.

10. A holographic projection device, comprising:
a plurality of reflective projection panels intersecting one another at an vertex;
an image display configured to project a plurality of images onto the plurality of reflective projection panels;
a position sensing module configured to detect projection coordinates of the vertex on the image display; and
a processor configured to receive a vector connecting coordinates of an image center of the image display and the projection coordinates of the vertex, and shift the plurality of images displayed on the image display according to the vector to project the plurality of images onto the plurality of reflective projection panels to form a holographic image.

11. The holographic projection device of claim 10, wherein the position sensing module comprises a plurality of image sensors.

12. The holographic projection device of claim 10, wherein the position sensing module comprises a touch sensor.

13. The holographic projection device of claim 10, wherein the processor is further configured to increase a distance between each of the plurality of images and the projection coordinates of the vertex to increase a distance between the holographic image and the image display.

14. The holographic projection device of claim 10, wherein the processor is further configured to decrease a distance between each of the plurality of images and the projection coordinates of the vertex to decrease a distance between the holographic image and the image display.

15. The holographic projection device of claim 10, wherein the processor is further configured to rotate the plurality of images with respect to the projection coordinates of the vertex on the image display.

* * * * *